United States Patent [19]

Donnelly

[11] Patent Number: 5,210,947
[45] Date of Patent: May 18, 1993

[54] METHOD OF MANUFACTURING AN IMPROVED DUCT

[76] Inventor: William J. Donnelly, 371 Commonwealth Ave., Boston, Mass. 02116

[21] Appl. No.: 800,502

[22] Filed: Nov. 27, 1991

[51] Int. Cl.$^5$ ............................................. B23P 11/02
[52] U.S. Cl. ................................. 29/890.144; 29/464
[58] Field of Search ...................... 29/890.14, 890.144, 29/464; 219/10.41, 10.43; 174/47

[56] References Cited

U.S. PATENT DOCUMENTS 2,112,238  3/1938  Guarnaschelli ............ 29/890.144 X
2,333,349  11/1943  Weatherhead, Jr. et al. ................................. 29/890.144 X
4,400,863  8/1983  Schroeder ................... 29/890.144 X Primary Examiner—Timothy V. Eley
Attorney, Agent, or Firm—Morse, Altman, Dacey & Benson

[57] ABSTRACT

A process of producing a duct by extruding a tubular casing composed of a polymeric foam, inserted a helically coiled reinforcing element composed of an electrically conductive metal into the tubular casing, and passing an electrical current through the reinforcing element in order to heat the reinforcing element above the softening point of the tubular casing and to embed the reinforcing element into the inner surface of the tubular casing.

3 Claims, 1 Drawing Sheet

METHOD OF MANUFACTURING AN IMPROVED DUCT

BACKGROUND OF THE INVENTION

The present invention relates to ducting and more particularly to an improved flexible duct construction of the kind suitable for use in ducted heating and airconditioning systems for example. The invention also relates to a method of manufacturing the duct.

Many differing forms of duct construction have been used in the past for heating and airconditioning duct construction, as well in the construction of ducts for ventilation and air extraction systems.

More recently some known constructions have been banned for health or safety reasons. For example, ducts constructed of fibreglass are now banned for health reasons and polypropylene foam is not suitable in fire-rated applications. Other constructions which are acceptable for use generally suffer some disadvantage or another such as being costly to produce or requiring expensive raw materials. In most cases, insulating material is added to the duct after the basic duct is constructed.

SUMMARY OF THE INVENTION

Accordingly it is an object of this invention to provide an improved duct construction which overcomes one or more of the disadvantages of known ducting constructions.

Thus, one broad form of the invention which may be preferred provides a duct construction comprising a tubular casing of foam plastics having a continuous wire-like reinforcing element extending around the inside of the casing and progressively along the length of the duct, said reinforcing element being recessed into the inner surface of the casing so as to remain fixed relative thereto whilst allowing bending of the duct to follow differing paths.

Preferably said tubular casing is cylindrical and said reinforcing element is of helical configuration.

Preferably said tubular casing is extruded and said reinforcing element is formed of wire.

Another broad form of the invention which may be preferred provides a method of manufacturing a duct comprising the steps of extruding a tubular casing of foam plastics, forming a continuous length of a wire-like reinforcing element around a mandrel in a manner whereby the element extends along the mandrel, said mandrel having dimension and shape substantially equivalent to the internal dimensions and shape of said casing, mechanically expanding said casing over said mandrel, allowing said casing to contract so as to contact said element, removing said mandrel and heating said reinforcing element to cause the element to melt said foam in the vicinity of said element whereby said element is caused to form a continuous groove in the inner surface of said casing, in which groove said element is located.

Preferably said heating is achieved by passing an electric current through said element.

Preferably said duct is of circular cross-section and said reinforcing element is helical.

BRIEF DESCRIPTION OF THE DRAWINGS

In order that the invention may be readily understood, one particular embodiment will now be described with reference to the accompanying drawings wherein:

As seen in FIG. 1, the duct according to this embodiment is of circular cross-section and is formed of extruded foam plastics material such as polyurethane foam. The process of extruding polyurethane foam is known per se. The duct 10 of FIG. 1 includes reinforcing wire (not shown in FIG. 1) to provide structural strength and integrity to the finished duct product.

Referring to FIG. 2, a mandrel 11 is arranged to rotate in the direction shown by arrow 12 to cause wire 13 to be wound in a helical path along the length of the mandrel. The wire 13 is of a springy-type wire and is electrically conductive.

The extruded duct 10 is cut to a suitable length and is expanded by insertion of a split mandrel (not shown) which is inserted into the cut length of the duct 10 to cause the diameter of the duct to be increased slightly. Since the polyurethane foam has some resilience and some "memory", it may be expanded slightly and will, over a period of time, contract to its original shape. By use of the split mandrel the duct 10 is expanded so as to be capable of installation over the mandrel 11 which has an outer diameter equal to the normal diameter of the duct 10. Once the duct 10 has been installed over the mandrel 11 and has contracted to its original diameter whereby it fits tightly over the mandrel 11, the mandrel 11, which is also a split mandrel, is contracted and withdrawn whereby the helically formed wire 13 extends along the length of the duct 10 against the inner surface thereof. Of course prior to insertion of the duct 10 over the mandrel 11 the wire 13 is terminated at each end of the mandrel 11 by means of clamping (not shown) at the ends.

Figure 1:
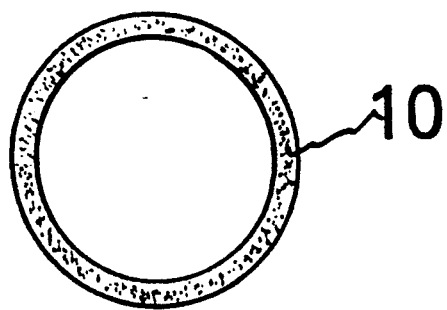
FIG. 1 is a cross-section of a duct according to the invention.
Figure 2:
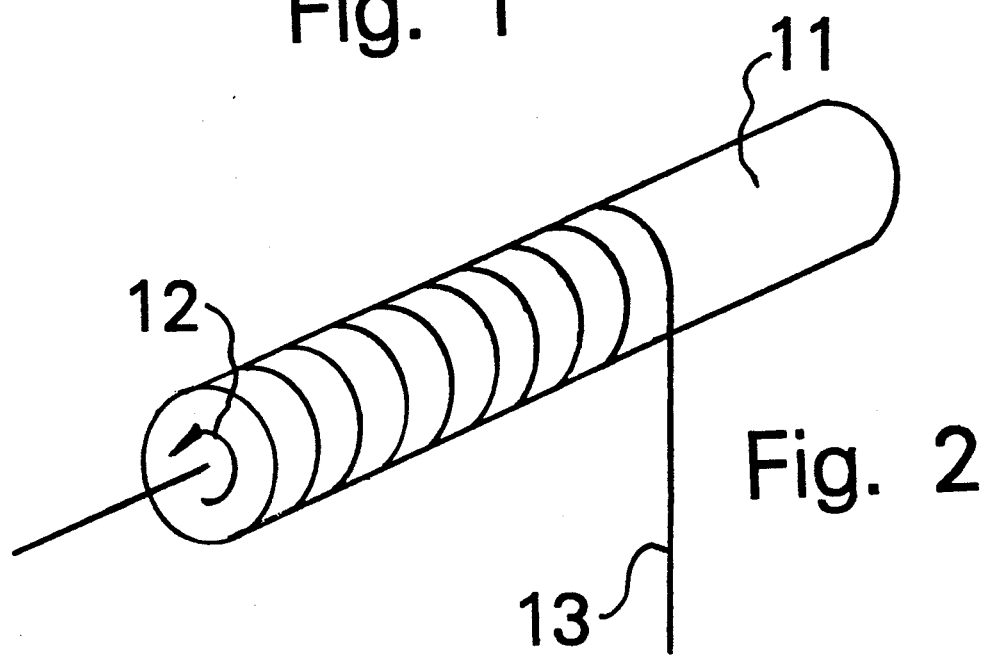
FIG. 2 is a schematic perspective view of a mandrel for forming a reinforcing element of the duct.
Figure 3:
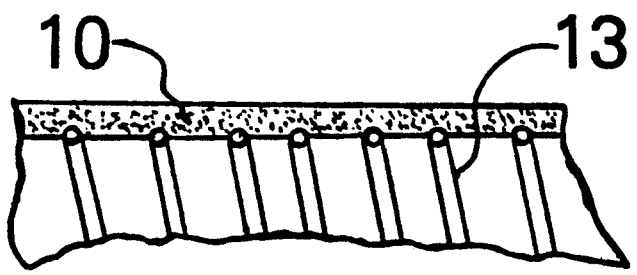
FIG. 3 is a part sectional side view of the duct of FIG. 1.

The final stage of manufacture involves securing the wire 13 to the inner surface of the duct 10 and this is achieved by application of a predetermined electrical current to the wire 13 whereby the wire is heated causing the foam duct in the vicinity of the wire to melt. The slight force of the helical wire against the inner surface of the duct 10 causes the wire to become embedded in the inner surface of the duct, as is shown more clearly in FIG. 3. Once embedded the wire 13 is strongly bonded within the duct 10 and provides a reinforcing element whereby the duct may be bent to follow various differing paths when it is in use. The wire also provides structural integrity whereby the duct will withstand a certain amount of external loads such as when it is being transported and when it is suspended in use.

The internal diameter and wall thickness may be varied according to the end use for which it is intended. Obviously the wall thickness controls the level of insulation performance to be achieved by the duct and may be varied accordingly.

It should be evident to persons skilled in the art that the duct according to the present invention and the method of manufacture thereof provides considerable improvements over known products. The duct has good insulating properties and therefore there is no need to add insulation as is the case with many known constructions such as metal duct. Of course the invention is not limited to the particular embodiment described hereinabove as many variations may be readily effected by persons skilled in the art. It is conceivable for example that the duct need not be of circular section but could be of rectangular section. Furthermore the diameter and wall thickness may be varied as previously mentioned. Also, the type of plastic foam material used to construct the duct may be varied considerably provided it has the necessary characteristics of insulating properties and ability to be extruded. The wire reinforcing element may be of plastic coated wire or could even be of totally plastic material. In the case where the reinforcing wire is electrically non-conducting and also when the wire is formed of electrically conducting material, an alternative embodiment avoids the necessity to pass electric current through the wire for the purpose of heating the wire and adjacent foam. In this alternative embodiment, the amount of contraction of the duct over the reinforcing wire is sufficient to cause the wire to be compressed into the inner surface of the duct and thereby be retained in position. The diameter of the helical wire should be slightly greater than the contracted inner diameter of the duct to ensure proper positive location of the reinforcing wire.

It should also be evident that the duct according to the invention has many uses such as transporting mechanically or naturally motivated movement of air or gases. In some applications and sizes the duct may be suitable for transporting low pressure liquids.

Since modifications within the spirit and scope of the invention may be readily effected by persons skilled in the art, it is to be understood that the invention is not limited to the particular embodiment described, by way of example, hereinabove.

What is claimed is:

1. For producing a duct, a process comprising the steps of:
   (a) extruding a substantially tubular casing composed of a polymeric foam;
   (b) coiling a continuous elongated reinforcing element composed of an electrically conductive metal helically about a split mandrel, said split mandrel having parts that are operable to contract to a normal mandrel diameter and expand to a slightly greater diameter, said parts having been expanded to said slightly greater than normal diameter;
   (c) inserting said expanded mandrel with said helically coiled element thereon into said tubular casing;
   (d) contracting said split mandrel and removing it from within said helically coiled element and said tubular casing; and
   (e) passing an electrical current through said elongated reinforcing element in order to heat said elongated reinforcing element above the softening point of said tubular casing and to embed said reinforcing element into the inner surface of said tubular casing.

2. The process of claim 1 wherein said polymeric foam comprises an elastomer.

3. The process of claim 1 wherein said polymeric foam comprises polyurethane.

* * * * *